United States Patent
Sebire

(10) Patent No.: US 6,850,501 B1
(45) Date of Patent: Feb. 1, 2005

(54) METHOD AND ARRANGEMENT FOR ENHANCING PRE-SYNCHRONIZATION RELIABILITY IN A CELLULAR RADIO SYSTEM

(75) Inventor: Benoist Sebire, Helsinki (FI)

(73) Assignee: Nokia Mobile Phones Ltd., Espoo (FI)

( * ) Notice: Subject to any disclaimer, the term of this patent is extended or adjusted under 35 U.S.C. 154(b) by 0 days.

(21) Appl. No.: 09/570,881

(22) Filed: May 15, 2000

(30) Foreign Application Priority Data

May 17, 1999 (FI) .................................................. 991123
Nov. 17, 1999 (FI) ............................................. 19992465

(51) Int. Cl.⁷ .......................... H04Q 7/00; H04L 12/50; H04B 7/212
(52) U.S. Cl. ...................... 370/329; 370/376; 370/345; 370/442
(58) Field of Search ................................ 370/329, 345, 370/376, 442, 321, 322, 459, 468, 528, 431, 261, 341, 332, 337, 347, 458, 943; 455/446, 449

(56) References Cited

U.S. PATENT DOCUMENTS

| | | | |
|---|---|---|---|
| 5,258,980 A | | 11/1993 | Maebara et al. ............ 370/95.1 |
| 5,711,003 A | * | 1/1998 | Dupuy ........................ 455/436 |
| 5,732,352 A | * | 3/1998 | Gutowski et al. ............ 455/437 |
| 6,327,469 B1 | * | 12/2001 | Gaastra ........................ 455/436 |
| 6,584,116 B1 | * | 6/2003 | Gourgue et al. ............. 370/442 |

FOREIGN PATENT DOCUMENTS

| | | | | |
|---|---|---|---|---|
| EP | 0 886 453 A2 | * | 12/1998 | ............ H04Q/7/38 |
| EP | 0 954 189 A2 | * | 11/1999 | ............ H04Q/7/22 |
| WO | WO 99/01000 | | 1/1999 | |

* cited by examiner

*Primary Examiner*—Afsar Qureshi
(74) *Attorney, Agent, or Firm*—Perman & Green, LLP

(57) ABSTRACT

A method is presented for enhancing pre-synchronization reliability in a cellular radio system. At least one base station in the cellular radio system is arranged to transmit at least two such transmissions (350, 351; 360, 361; 370, 371; 380, 381) that are usable for mobile stations in pre-synchronization. Said two transmissions are relatively close to each other in succession and they are timed to occur approximately at a time when there is a temporary idle period in an active communication connection between a mobile station and a base station.

7 Claims, 6 Drawing Sheets

METHOD AND ARRANGEMENT FOR ENHANCING PRE-SYNCHRONIZATION RELIABILITY IN A CELLULAR RADIO SYSTEM

TECHNOLOGICAL FIELD

The invention concerns generally the technology of anticipatorily synchronizing a mobile station of a cellular radio system to a number of base transceiver stations (or "base stations") of the same. Especially the invention concerns the timing arrangements that are used to facilitate effective pre-synchronization.

BACKGROUND OF THE INVENTION

An important part of the operation of a mobile station in a cellular radio system is the constant preparation for handovers. To enhance its preparedness for changing base stations, a mobile station usually performs pre-synchronization which means that it receives brief transmissions from other base stations than the one with which it is currently actively communicating. Each base station transmits these brief information bursts on a certain channel, which may be called a synchronization channel or SCH. By decoding the contents of the SCH transmissions the mobile station keeps itself aware of the availability of alternative communication resources through other base stations and the timing of their occurrence.

As an example we will discuss the known GSM or Global System for Mobile telecommunications. Each GSM base station transmits on a certain beacon frequency a pattern of common channel transmission bursts, in which an SCH burst occurs five times in a cycle of 51 frames (a frame consists of eight consecutive Burst Periods, known also as BPs or time slots). To be exact, the SCH bursts occur in the first time slot (i.e. the time slot number 0) of frames 0, 10, 20, 30 and 40. A mobile station that is in active communication with a certain base station uses a most typically a so-called full rate traffic channel meaning that it receives during one time slot per each downlink frame and transmits during one time slot per each uplink frame with the exception that once in each cycle of 26 consecutive frames there is a so-called idle frame during which the mobile station does not receive or transmit user data. As a result of the idle frame concept the mobile station has, once in every 26 frames, the opportunity to use a longer time period for measuring, receiving and decoding the synchronization signals from other base stations. Let us analyze the length of said longer time period, known also as the measurement window, in somewhat greater detail.

FIG. 1 illustrates a part of a train of downlink transmission frames and a part of the corresponding train of uplink transmission frames. In each transmission frame the numbering of time slots goes from 0 to 7. There is a numbering shift of 3 time slots between downlink and uplink so that the uplink time slot number 0 occurs simultaneously with the downlink time slot number 3, the uplink time slot number 1 occurs simultaneously with the downlink time slot number 4 and so on. Additionally there is a small alignment difference designated as α between uplink and downlink. A full-rate traffic channel is bidirectional and uses the same time slot number in both directions. The hatched frames in each direction are the idle frames during in which no transmission of user data takes place.

The length of the measurement window is independent of the time slot number used by the traffic channel, but its location in relation to the idle frame borders is not. Let us assume that time slot 3 is used. The measurement window 101 during which the mobile station does not have any activity relating to the traffic channel starts at the end of the uplink time slot 3 in the last uplink frame before the idle frame and ends at the beginning of the downlink time slot 3 in the first downlink frame after the idle frame. The theoretical maximum length of the time available for measurements equals therefore the total length of 12 successive time slots or BPs plus α. Measurement window locations for traffic channels that use other time slot numbers are easily obtained from FIG. 1 by shifting the measurement window 101 left or right by intervals of one time slot in length.

FIG. 1 also shows the shorter windows 102 and 103 that are available for the mobile station during each frame. The lengths of these shorter windows are 2 BPs−α and 4 BPs+α respectively. They are usually too short for reasonable measuring of synchronization bursts from other base stations. We must remember that propagation delays, the settling times of tunable components and other sources of error in timing make the actual available length of the measurement windows shorter than the theoretical maximum.

The occurrence of an idle frame once in every 26 frames on one hand and the transmission of SCH bursts in periods of 51 frames on the other hand guarantee that even if a mobile station would not be able to catch an SCH burst from a certain base station in a certain measurement window due to misaligned timing, it will be able to do so during some of the following measurement windows: the numbers 26 and 51 have no common divisors greater than one. However, it may take as long as 11 times 26 frame durations before the next opportunity arrives. In some cases this delay may seriously degrade pre-synchronization effectiveness.

The situation may be even worse in such systems where there is an attempt to align the measurement windows to the occurrence of SCH bursts from neighboring base stations. For example in a proposed enhancement to the existing GSM it has been suggested that both the packet data channels and the control channels relating to packet data services should be based on a multiframe structure of 52 consecutive transmission frames. The control channel timing should be aligned with that of traffic channels so that for example the SCH transmissions should all take place during the idle frames in the traffic channels. Let us analyze the resulting relations between SCH transmissions and measurement windows depending on which traffic channel slot the mobile station is using. For simplicity we will again assume that a bi-directional full rate traffic channel is concerned.

FIG. 2a illustrates the arrangement of five partially overlapping cells 201, 202, 203, 204 and 205. In each cell there is a base station BTS. In each of the cells 201, 202, 203 and 204 there is also a mobile station 206, 207, 208 and 209. For each of these mobile stations cell 205 (among others) is a candidate for handover, so they must try to pre-synchronize themselves to the base station of cell 205 by receiving its SCH transmissions. We will first assume that all base stations in FIG. 2a apply synchronized frame timing so that the idle frames are simultaneous for all mobile stations.

FIG. 2b illustrates the possible measurement window occurrences for mobile stations 206, 207, 208 and 209 depending on the time slot used for the traffic channel for each of them. The vertical hatched columns 210, 211, 212 and 213 illustrate four alternative transmission times of an SCH burst from the base station of cell 205. These alternative transmission times correspond to the time slots 1, 3, 5 and 7 of the synchronized downlink idle frames. Naturally the transmission time of the SCH burst could as well be selected to coincide with any of the time slots 0, 2, 4 or 6 of the synchronized downlink idle frames. For each mobile station eight possible measurement window locations 206A to 206H, 207A to 207H, 208A to 208H and 209A to 209H are shown.

We may expect that if the measurement window starts or ends exactly simultaneously with the start or end of the SCH transmission time respectively, it is not possible to use the SCH signal for pre-synchronization. If the SCH transmission time is within the measurement window but closer than one time slot width from its border, it is still doubtful whether the pre-synchronization will be successful. Only if the SCH transmission time is well within the measurement window the pre-synchronization will succeed. Based on this assumption and the teachings of FIG. 2b we may formulate the following table:

TABLE 1

| Time slot # of traffic ch. | Pre-synchronization to SCH burst coincident with idle time slot # | | | |
|---|---|---|---|---|
| | 1 | 3 | 5 | 7 |
| 0 | X | X | X | |
| 1 | X | X | X | ? |
| 2 | X | X | X | X |
| 3 | X | X | X | X |
| 4 | X | X | X | X |
| 5 | ? | X | X | X |
| 6 | | X | X | X |
| 7 | | ? | X | X |

Here X means successful pre-synchronization, ? means unreliable pre-synchronization and an empty box means no pre-synchronization at all. For example we may note that if the SCH transmission is synchronized to be coincident with the time slot 1 of the downlink idle frame, those mobile stations using one of the time slots from 0 to 4 for their traffic channel will be able to pre-synchronize, a mobile station using time slots 5 for its traffic channel will be only possibly able to pre-synchronize, and those mobile stations using one of the time slots 6 or 7 for their traffic channel will not be able to pre-synchronize.

The example shown in FIG. 2b relies on the above-mentioned assumption that the mobile stations 206, 207, 208 and 209 have simultaneous idle frames. FIG. 2c illustrates an alternative situation known as synchronized shifted idle frames. The frame cycles of the base stations in cells 201, 202, 203 and 204 are synchronized to each other with a shift of two time slots from cell to cell. In other words, the idle frame of mobile station 207 begins two time slots later than that of mobile station 206, the idle frame of mobile station 208 begins further two slots later and so on.

The reference designators in FIG. 2c are the same as in FIG. 2b, because only the mutual timing of the idle frames is changed.

The mobile station designated as 206 has the best chance for successful presynchronization. The successive time shifts concerning the other mobile stations mean that the mobile station designated as 209 has only very modest possibilities for successful presynchronization: only the SCH burst transmitting times 212 and 213 are possible, and even then the mobile station 209 must have some of the very first time slots in a frame allocated for its full-rate traffic channel.

There exists a prior art proposal of reducing the uncertainty in successful presynchronization by lengthening the measurement window of each mobile station. In practice this means that the transmission of payload data is forbidden for the continuous duration of more than one idle frame at each time. A longer measurement window certainly increases the chances of a certain SCH burst to be received, but simultaneously it leaves a smaller relative amount of radio resources to the transmission of payload data, making it difficult to maintain a circuit-switched connection.

SUMMARY OF THE INVENTION

It is an object of the present invention to present a method and arrangement for enhancing pre-synchronization reliability in a cellular radio system.

The objects of the invention are achieved by transmitting from the base stations of the cellular radio system a number of such transmissions which the mobile stations may use for pre-synchronization.

The method according to the invention is characterized in that it comprises the steps of composing a first message that contains information relating to pre-synchronization transmitting said first message at least two times on a common channel within a first transmission cycle and recurrently repeating the transmission according to said first transmission cycle within a second transmission cycle, the length in time of which is remarkably longer than the length in time of said first transmission cycle.

The invention also applies to a base station arrangement which is characterized in that it comprises means for composing a first message that contains information relating to pre-synchronization means for transmitting said first message at least two times on a common channel within a first transmission cycle and means for recurrently repeating the transmission according to said first transmission cycle within a second transmission cycle, the length in time of which is remarkably longer than the length in time of said first transmission cycle.

According to the invention, there is defined a so-called idle frame for each base station. This is the frame during which there is supposed to be no transmissions of actual user data so that the mobile stations communicating with the base stations may use the corresponding time for pre-synchronization measurements. Additionally it is defined that approximately during the time when there is a known idle frame in a certain base station, at least one other base station—which is a potential candidate for handover for the mobile stations in the cell of the first mentioned base station—emits a number of such transmissions which the mobile stations may use for pre-synchronization. The number of such transmissions is at least two, and their relative locations are most advantageously one frame period from each other. The more there are such transmissions, the better are the chances for each mobile station to achieve successful pre-synchronization during only a single idle frame. On the other hand it is not advantageous to increase the number of such transmissions very much, because they reserve capacity from the radio interface and cause interference to such connections where a pre-synchronization is not taking place at the moment.

The invention is applicable irrespective of whether a shift between idle frames is employed at neighboring base stations or not. The optimal number of pre-synchronization transmissions from each base station may, however, depend on whether simultaneous synchronization or shifted synchronization is employed.

BRIEF DESCRIPTION OF DRAWINGS

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

Like parts in the drawings are referred to by the same reference designators. Prior art was described with reference to FIGS. 1 to 2c, so the following description of the invention through its advantageous embodiments will focus on FIGS. 3a to 5.

DETAILED DESCRIPTION OF THE INVENTION

Figure 1:
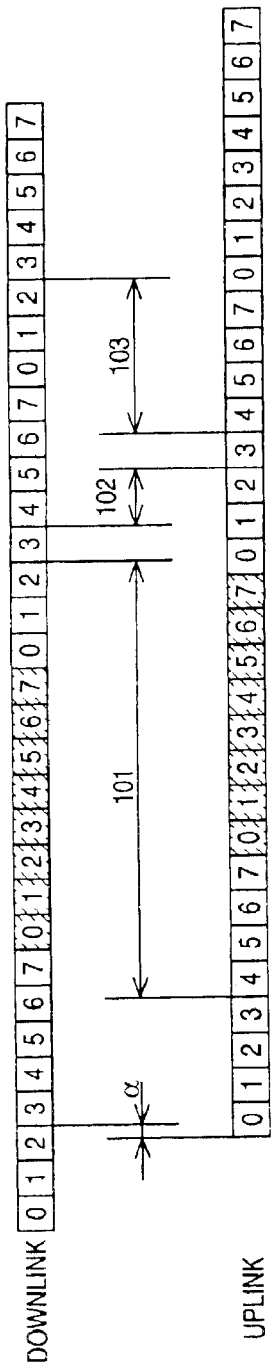
FIG. 1 illustrates some known aspects of frame timing.
Figure 2A:
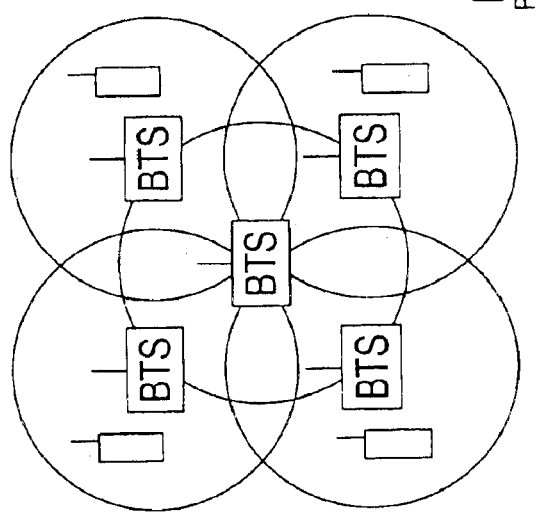
FIG. 2a shows schematically a certain group of cells.
Figure 2B:
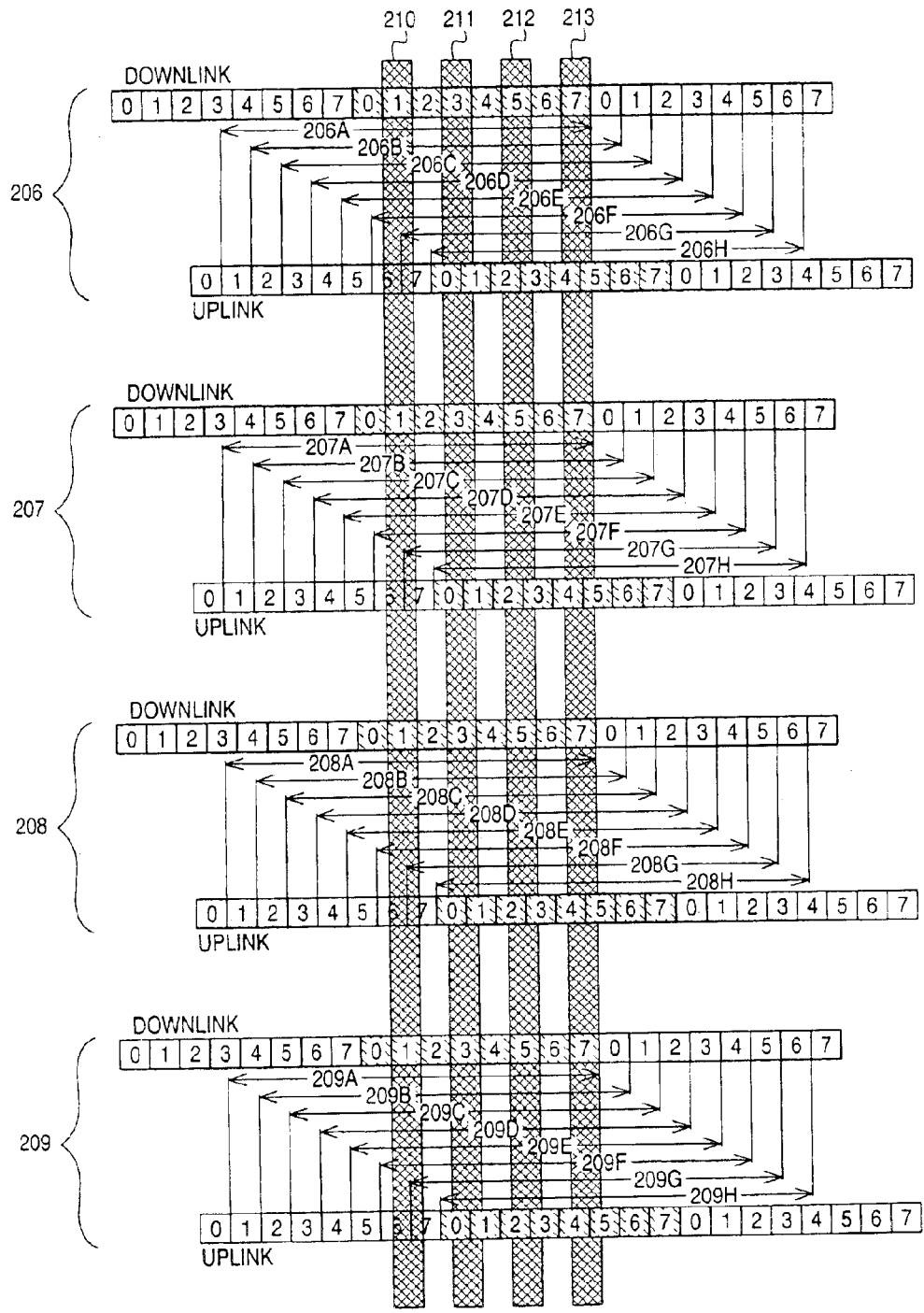
FIG. 2b illustrates known pre-synchronization in a system employing simultaneous synchronized idle frames.
Figure 3A:
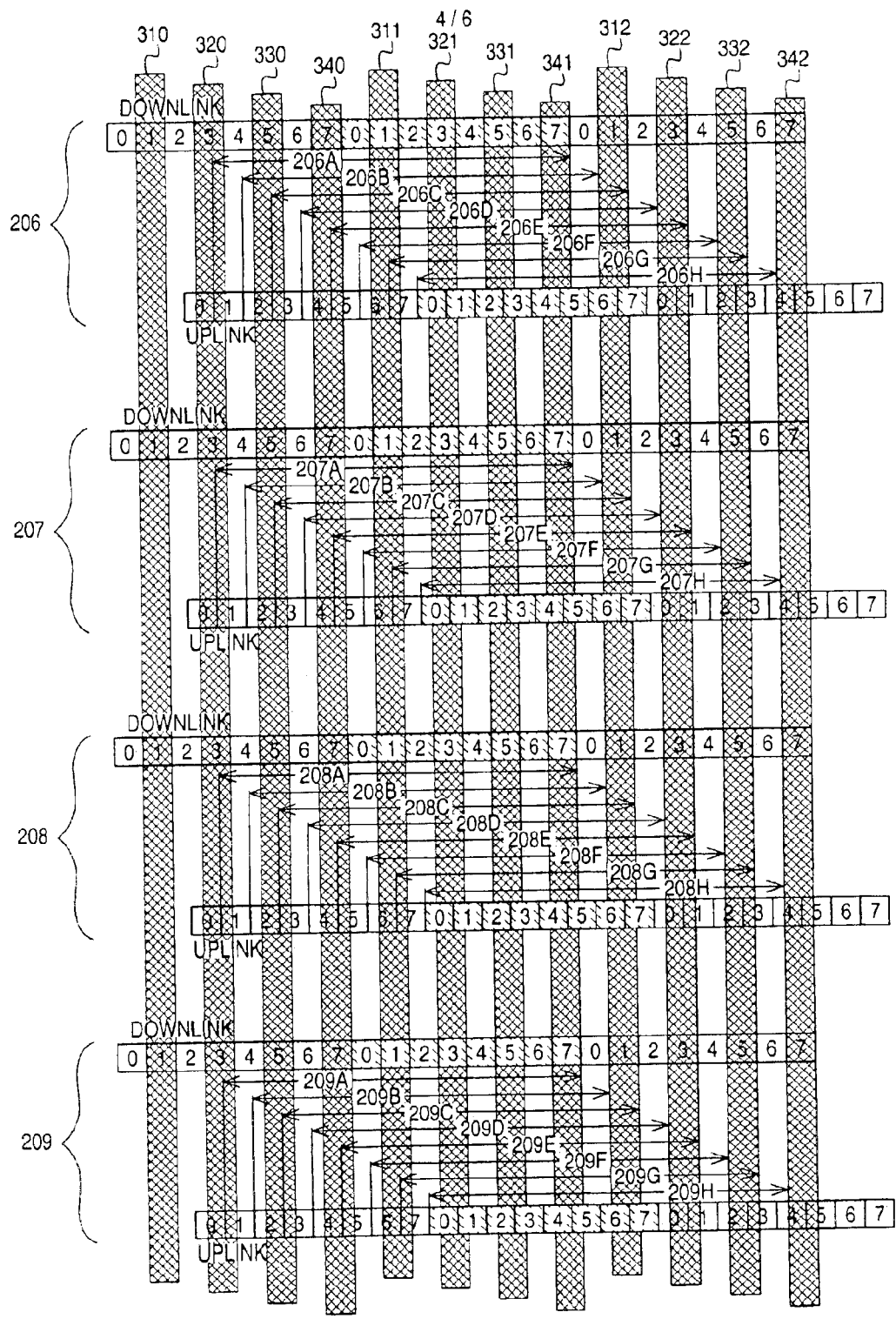
FIG. 3a illustrates pre-synchronization according to an embodiment of the invention in a system employing simultaneous synchronized idle frames.

FIG. 3a is related to the prior art case of FIGS. 2a and 2b in that there are four mobile stations 206, 207, 208 and 209 which strive to receive a pre-synchronization enabling transmission from a base station which is not the same as their serving base station. Additionally we know that simultaneous synchronization of idle frames is employed in the cellular radio system in question so that each mobile station has an idle frame simultaneously. The graphical representation of uplink and downlink time slots and idle frames is the same as in FIG. 2b.

The vertical cross-batched columns represent potential transmission moments for the pre-synchronization-enabling transmission, which we may call the SCH burst for short. The potential transmission moments are grouped into four groups of three transmission moments: the first group consists of the transmission moments 310, 311 and 312, the second group consists of the transmission moments 320, 321 and 322, the third group consists of the transmission moments 330, 331 and 332 and the fourth group consists of the transmission moments 340, 341 and 342. Graphically the transmission moments belonging to a group are shown at the same level in the vertical direction. The total length of time it takes to transmit an SCH burst at each transmission moments of a group may be called the cycle period of the group.

According to an advantageous embodiment of the invention one of the above-mentioned groups is employed to define the transmission moments for the SCH bursts. For example if the first group is selected, an SCH burst is transmitted during the time slot number 1 of the idle frame (transmission moment 311) but also exactly one frame length earlier (310) and exactly one frame length later (312). It is not essential to the invention that the transmission moments are exactly one frame length apart, but it helps in setting up the overall transmission timetable on the channel which the SCH bursts belong to.

We may analyze the chances for successful pre-synchronization in the mobile stations 206, 207, 208 and 209 in tabular form like we did in the description of prior art. In the case of FIG. 3a all mobile stations have their measurement windows simultaneously, so it is sufficient to show a single table.

TABLE 2

| Time slot # of traffic ch. | Pre-synchronization to SCH burst coincident with idle time slot # | | | |
|---|---|---|---|---|
| | 1 | 3 | 5 | 7 |
| 0 | X | X | X | X |
| 1 | X | X | X | X |
| 2 | X | X | X | X |
| 3 | X | X | X | X |
| 4 | X | X | X | X |
| 5 | X | X | X | X |
| 6 | X | X | X | X |
| 7 | X | X | X | X |

In Table 2 the symbol "X" indicates successful pre-synchronization. It is immediately seen that regardless of which time slot has been allocated for the full-rate traffic channel which a mobile station uses for the transmission of payload data, pre-synchronization will always succeed. If we compare Table 2 to Table 1 we note that the prior art solution made it impossible to presynchronize e.g. with an SCH burst coincident with idle time slot 1 if the time slot 6 or 7 was allocated to the traffic channel, but the invention makes it possible. This is due to the fact that even if the last two measurement windows (e.g. regarding mobile station 206, measurement windows 206G and 206H) are too late to catch an SCH burst transmitted at transmission moment 311, they are very well placed in order to catch an SCH burst of the same group transmitted at transmission moment 312.

The transmission according to FIG. 3a is repeated at every occurrence of an idle frame at the nearby base station(s). The total length of time it takes to transmit a number of SCH bursts and to wait for the next occurrence of an idle frame at the nearby base station(s) may be called the cycle period of repeating the whole SCH transmission.

Figure 2C:
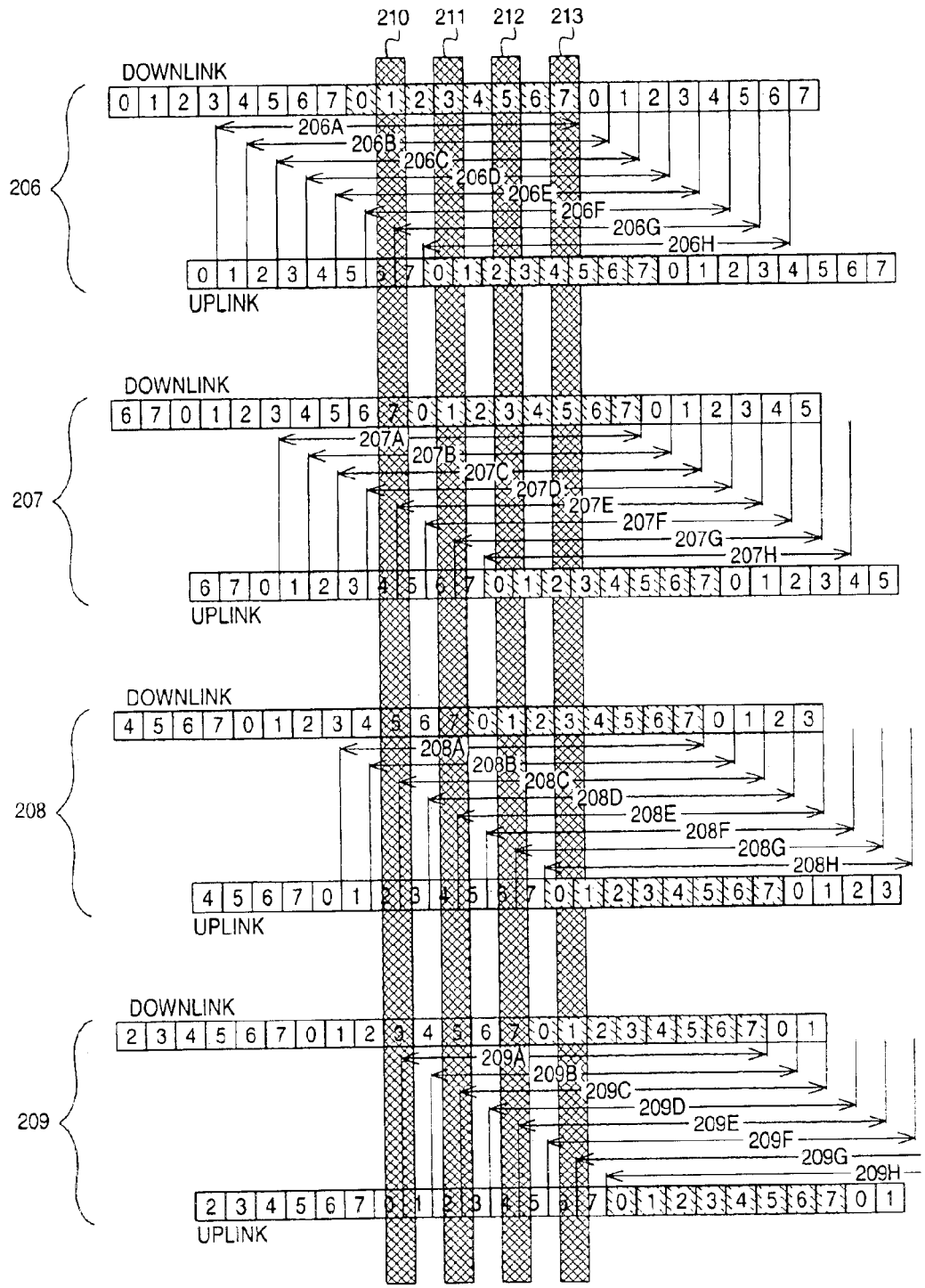
FIG. 2c illustrates known pre-synchronization in a system employing shifted synchronized idle frames.
Figure 3B:
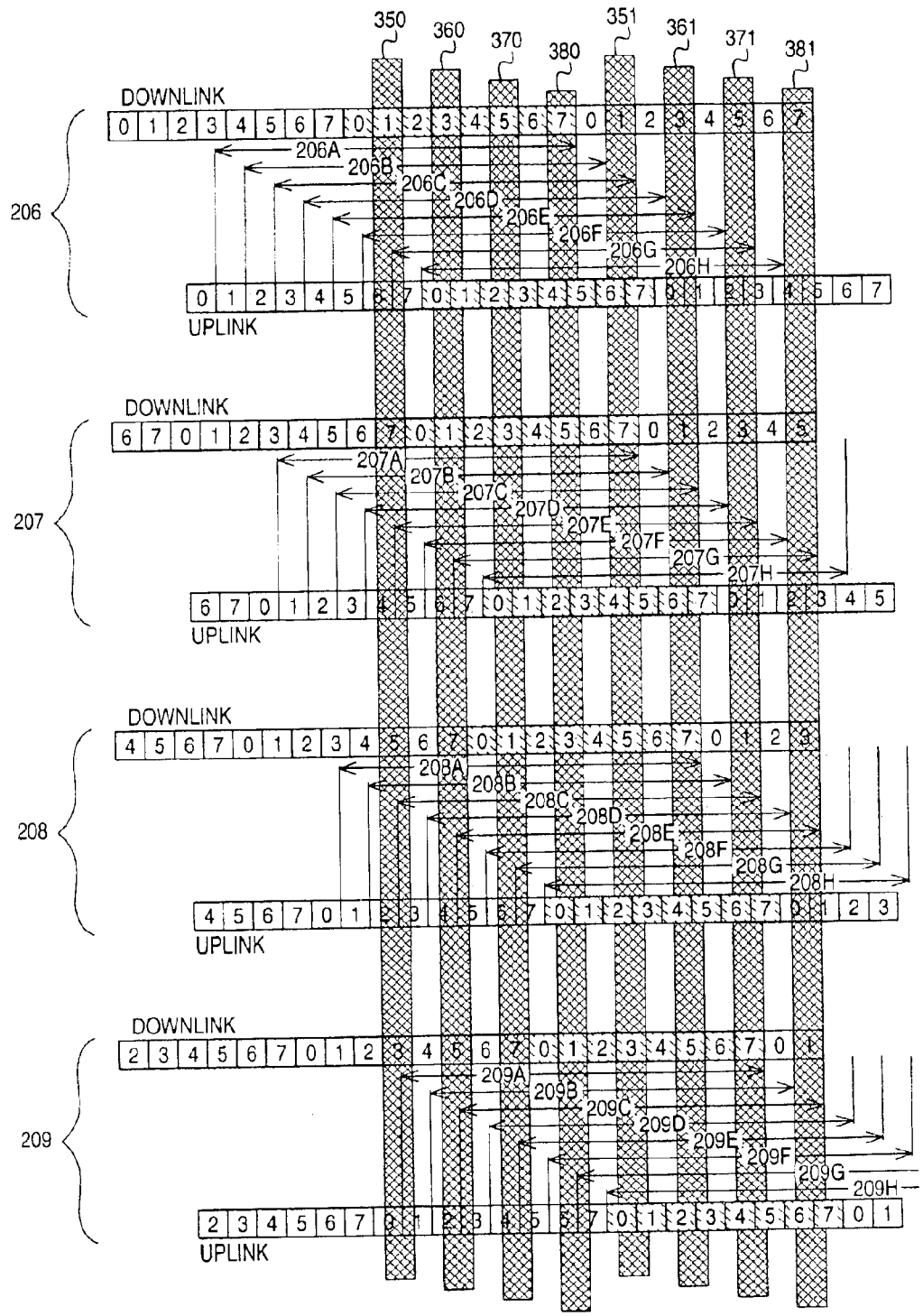
FIG. 3b illustrates pre-synchronization according to an embodiment of the invention in a system employing shifted synchronized idle frames.

FIG. 3b is related to the prior art case of FIGS. 2a and 2c in that there are four mobile stations 206, 207, 208 and 209 which strive to receive a pre-synchronization enabling transmission from a base station which is not the same as their serving base station. Additionally we know that shifted synchronization of idle frames is employed in the cellular radio system in question so that the mobile stations do not have their idle frames simultaneously. The graphical representation of uplink and downlink time slots and idle frames is the same as in FIG. 2c.

The vertical cross-hatched columns represent again the potential transmission moments for the SCH bursts, and they are again grouped into four groups. This time there are two transmission moments in each group: the first group consists of the transmission moments 350 and 351, the second group consists of the transmission moments 360 and 361, the third group consists of the transmission moments 370 and 371 and the fourth group consists of the transmission moments 380 and 381. Again according to an advantageous embodiment of the invention one of the above-mentioned groups is employed to define the transmission moments for the SCH bursts. It is also not essential to the invention that the transmission moments are exactly one frame length apart.

We may analyze the chances for successful pre-synchronization in the mobile stations 206, 207, 208 and 209 in tabular form like we did in the description of prior art and the above-described first embodiment of the invention. Since all mobile stations have their measurement windows at different times in relation to the transmission moments we must draw a separate table section for each mobile station.

TABLE 3

| Mobile station | Time slot # of traffic ch. | Pre-synchronization to SCH burst coincident with idle time slot # | | | |
|---|---|---|---|---|---|
| | | 1 | 3 | 5 | 7 |
| 206 | 0 | X | X | X | |
| | 1 | X | X | X | ? |
| | 2 | X | X | X | X |
| | 3 | X | X | X | X |
| | 4 | X | X | X | X |
| | 5 | X | X | X | X |
| | 6 | X | X | X | X |
| | 7 | X | X | X | X |
| 207 | 0 | X | X | X | X |
| | 1 | X | X | X | X |
| | 2 | X | X | X | X |
| | 3 | X | X | X | X |
| | 4 | X | X | X | X |
| | 5 | X | X | X | X |
| | 6 | X | X | X | X |
| | 7 | X | X | X | X |
| 208 | 0 | X | X | X | X |
| | 1 | X | X | X | X |
| | 2 | X | X | X | X |
| | 3 | X | X | X | X |
| | 4 | X | X | X | X |
| | 5 | X | X | X | X |
| | 6 | X | X | X | X |
| | 7 | X | X | X | X |
| 209 | 0 | X | X | X | X |
| | 1 | X | X | X | X |
| | 2 | X | X | X | X |
| | 3 | X | X | X | X |
| | 4 | X | X | X | X |
| | 5 | X | X | X | X |
| | 6 | ? | X | X | X |
| | 7 | | X | X | X |

Table 3 shows that pre-synchronization should succeed in almost all cases. Mobile station 206 may have difficulties if the time slot number 0 or 1 has been allocated to the traffic channel and the transmission moments for the SCH bursts are chosen from the fourth group, and mobile station 209 may have difficulties if the time slot number 6 or 7 has been allocated to the traffic channel and the transmission moments for the SCH bursts are chosen from the first group. Even these possibilities may be excluded by adding a third transmission moment at the beginning of each group like in the embodiment shown in FIG. 3a.

Figure 4:
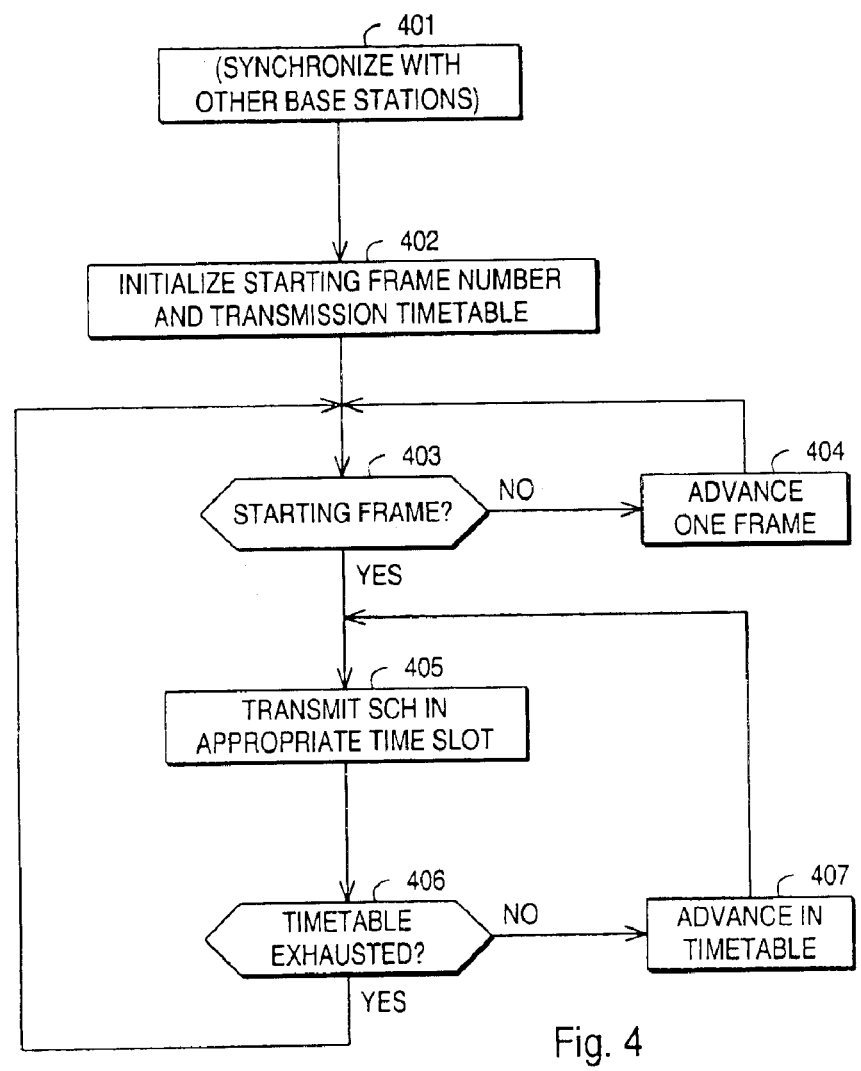
FIG. 4 illustrates schematically a method according to an embodiment of the invention and FIG. 5 illustrates schematically some parts of a base station arrangement according to an embodiment of the invention.

FIG. 4 illustrates a method according to an embodiment of the invention in the form of a flow diagram. Step 401 is the synchronization step where the frame and slot timing of a certain first base station is synchronized to the frame and slot timing of certain other nearby base stations in order to enable the alignment of the frame during and around which the first base station transmits its SCH bursts with the idle frames of the other base stations. The synchronization may be simultaneous or shifted. This kind of synchronization is a part of the normal initialization of a base station and not actually a part of the invention (although an important prerequisite for the invention to work properly), which is emphasized in FIG. 4 by presenting step 401 in parentheses.

At step 402 the actual transmission of SCH bursts from said first base station is initialized by defining the cyclically occurring frame, and the time slot within the frame, during which the first transmission moment occurs. Regarding the exemplary embodiments of FIGS. 3a and 3b, this means one of the transmission moments 310, 320, 330, 340, 350, 360, 370 or 380 depending on whether simultaneous or shifted synchronization is employed and on which group of transmission moments is selected. It should be noted that FIGS. 3a and 3b show only a part of the possible selections for transmission moments. Additionally step 402 comprises the determination of the number and sequential timing of SCH transmissions belonging to the selected group. For example regarding FIG. 3a, this would mean that the rule "three transmission moments, exactly one frame length apart" would be laid down.

Step 402 may even be completely neglected if the system specifications already define the SCH transmission timetable in relation to a certain frame structure. In such a case the initialization referred to above is already fixed at the time when the base station is synchronized for the first time at step 401.

After the initialization is complete and normal transmission and reception of frames has started, the base station observes the frame numbers and goes round in the loop consisting of steps 403 and 404 until a positive finding at step 403 indicates that it is time to transmit the first SCH burst. Thereafter the base station follows the timetable that defines the number and sequential timing of SCH transmissions belonging to the selected group by looping through states 405, 406 and 407 until a positive finding at step 406 indicates that all SCH bursts have been transmitted. Thereafter the base station returns to the loop of steps 403 and 404 to wait for the next cyclical occurrence of the starting frame.

Figure 5:
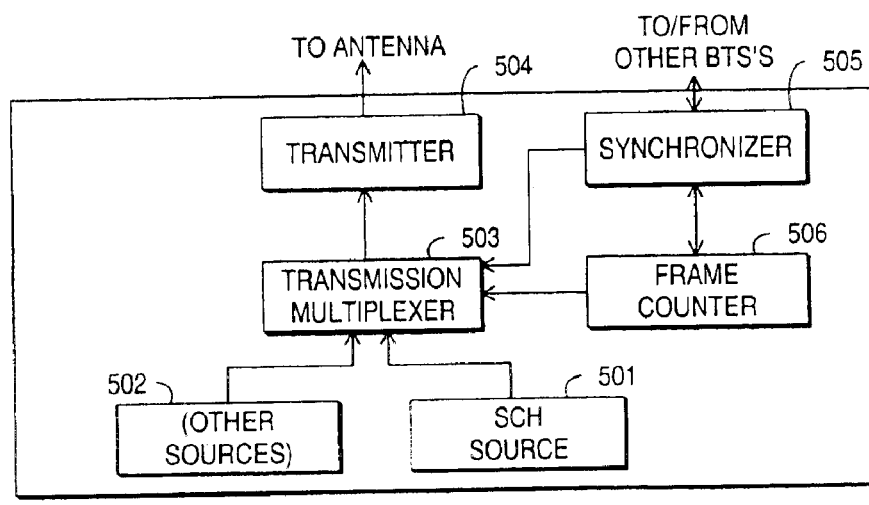

FIG. 5 is a schematic block diagram of those blocks in a base station according to an embodiment of the invention which have importance to the invention. SCH bursts are formatted in an SCH source block 501 which, together with other signal source blocks 502 is coupled to a transmission multiplexer 503. From there the currently chosen signal to be transmitted is led into a transmitter 504. A synchronizer block 505 provides synchronization with other base stations, and a frame counter block 506 keeps track of the frame numbers and transmission timetables. It controls the transmission multiplexer 503 so that the latter is able to select the correct signal source at all transmission moments. The technical implementation of the blocks shown in FIG. 5 is obvious to a person skilled in the art on the basis of the above-given functional description.

The use of the term "SCH" does not limit the applicability of the invention; it is perfectly possible to apply the invention into the transmission of all such signals which the mobile stations should be able to receive within an idle frame in the middle of an active communication connection.

What is claimed is:

1. A method for transmitting messages containing information relating to pre-synchronization between a first base station and such mobile stations in a cellular radio system that are in communication connection with a server base station other than the first base station, comprising the steps of:

composing a first message that contains information relating to pre-synchronization, transmitting said first message at least two times on a common channel within a first transmission cycle and recurrently repeating the transmission according to said first transmission cycle within a second transmission cycle, the length in time of which is significantly longer than the length in time of said first transmission cycle.

2. A method according to claim 1, comprising the step of synchronizing said second transmission cycle with the recurrent occurrence of an idle frame at least one of the other base stations so that said first transmission cycle always takes place at least partly simultaneously with an idle frame at least one of the other base stations.

3. A method according to claim 1, comprising the step of synchronizing said second transmission cycle with the recurrent occurrence of an idle frame at a number of the other base stations so that said first transmission cycle always takes place at least partly simultaneously with an idle frame at each of said number of other base stations.

4. A method according to claim 1, wherein the step of transmitting said first message at least two times on a common broadcast channel within a first transmission cycle comprises the step of transmitting said first message at least two consecutive times with exactly one frame length between consecutive transmissions so that the length in time of said first transmission cycle is an integral number of frames plus the time it takes to transmit said first message once.

5. A method according to claim 1, wherein the step of composing a first message that contains information relating to pre-synchronization comprises a step pf composing an SCH burst according to the GSM cellular radio system.

6. An arrangement for transmitting messages containing information relating to pre-synchronization between a first base station and such mobile stations in a cellular radio system that are in communication connection with a server base station other than the first base station, the arrangement comprising:

means for composing a first message that contains information relating to pre-synchronization, means for transmitting said first message at least two times on a common channel within a first transmission cycle and means for recurrently repeating the transmission according to said first transmission cycle within a second transmission cycle, the length in time of which is significantly longer than the length in time of said first transmission cycle.

7. An arrangement according to claim 6, comprising a synchronization arrangement for synchronizing said second transmission cycle with the recurrent occurrence of an idle frame at least one of the other base stations so that said first transmission cycle is arranged to always take place at least partly simultaneously with an idle frame at least one of the other base stations.

* * * * *